United States Patent [19]

Mueller

[11] 4,320,939

[45] * Mar. 23, 1982

[54] OPTICAL FILTERING ELEMENT INCLUDING FLUORESCENT MATERIAL

[76] Inventor: Gary E. Mueller, 2103 Essex La., Colorado Springs, Colo. 80903

[*] Notice: The portion of the term of this patent subsequent to Mar. 23, 1999, has been disclaimed.

[21] Appl. No.: 74,911

[22] Filed: Sep. 13, 1979

Related U.S. Application Data

[63] Continuation-in-part of Ser. No. 917,079, Jun. 19, 1978, abandoned.

[51] Int. Cl.³ .................................................. G02C 7/10
[52] U.S. Cl. ..................................... 351/44; 252/582; 273/DIG. 17; 273/DIG. 27; 350/311; 351/163; 351/165
[58] Field of Search ............... 252/300, 301.34, 301.35; 350/311; 351/44, 163, 165; 260/351, 566; 544/99; 546/18, 483, 486; 250/461 R, 467; 40/615, 543; 273/DIG. 17, DIG. 27

[56] References Cited

U.S. PATENT DOCUMENTS

| | | | |
|---|---|---|---|
| 2,498,593 | 2/1950 | Switzer et al. | 428/220 |
| 3,189,914 | 6/1965 | Gusewitch et al. | 351/163 |
| 3,214,382 | 10/1965 | Windsor | 252/301.35 |
| 3,426,212 | 2/1969 | Klaas | 252/301.35 |

FOREIGN PATENT DOCUMENTS

| | | | |
|---|---|---|---|
| 504529 | 7/1954 | Canada | 252/301.35 |
| 569920 | 6/1945 | United Kingdom | 252/301.35 |

OTHER PUBLICATIONS

Shah, J. et al., "Excited-State Absorption Spectrum of Cresyl Violet Perchlorate", *Appl. Phys. Lett.*, 24(11), pp. 562-564, (Jun. 1974).
Chem. Abs., 85:114369n, Drexhage, K. et al., "New Highly Efficient Laser Dyes".

*Primary Examiner*—Deborah L. Kyle
*Attorney, Agent, or Firm*—Donald W. Margolis; H. Kenneth Johnston, II

[57] ABSTRACT

Optical filtering elements having two opposed surfaces and including at least one thin layer of stable non-reflective fluorescent material provide transparent articles which, when exposed to incident electromagnetic radiation at one surface of the fluorescent layer, absorb certain wavelengths within the fluorescent layer and emit other wavelengths at the opposed surface of the fluorescent layer. In preferred embodiments, when radiation (light) in the visible range (about 400 nm to about 700 nm) is incident on the element from one side, certain wavelengths of radiation which transverse the element are absorbed in the fluorescent layer and other radiation of greater, but also visible wavelengths are emitted from the opposed side without fluorescent light being reflected by the fluorescent layer at the incident side. Methods of forming such optical filtering elements include providing a thin coating or layer including stable fluorescent material on an optical element by means of a solution or coating composition including stable fluorescent material, forming transparent sheets or films containing stable fluorescent material and utilizing them as optical filtering elements or incorporating them in an optical structure, or in other ways incorporating thin layers of stable fluorescent material within an optical element. In order to avoid glare and reflection of fluorescent light at the incident side, preferred embodiments require layers of stable fluorescent material which are about 1 mil (0.0254 mm) or less in thickness.

14 Claims, 12 Drawing Figures

OPTICAL FILTERING ELEMENT INCLUDING FLUORESCENT MATERIAL

CROSS REFERENCE TO RELATED PATENT APPLICATION

This application is a continuation-in-part to application Ser. No. 917,079, filed June 19, 1978, and now abandoned.

BACKGROUND OF THE INVENTION

1. Field of the Invention

The invention relates to optical filtering elements and is more particularly concerned with optical lens elements including transparent fluorescent materials, which elements absorb visible radiation of certain wavelengths and emit and transmit radiation at longer, but also visible, wavelengths without reflecting substantial amounts of radiation.

2. Description of the Prior Art

Ordinary radiant energy, such as that provided by the sun, is normally grouped into three regions, the near ultraviolet (about 300–400 nm), the visible (about 400–700 nm) and the near infrared (about 700–4000 nm). Many types of optical filtering elements are provided for various purposes, but by far, the most common type of optical filtering element used with these wavelengths is that utilized in a sunglass lens. An important requirement for sunglass lenses is that they absorb significant amounts of visible radiation. Natural daylight or sunlight includes a nearly uniform distribution of light energy over the visible region. Absorption of or reduction in the transmission of visible light has been achieved, for example, by the use of lens systems employing various dyes, opacifiers (such as dyes and thin metal coatings) and/or polarizing materials, either alone or in various combinations. Dyes which absorb transversing light well in the visible portion of the spectrum have been used in optical systems, including sunglass lenses. The primary criterion for selection of such dyes has been their ability to absorb broad bands of radiation energy with minimal alteration of the spectral distribution of the radiation. However, the desired decrease of light intensity which is provided by dyes which produce broad band visible radiation absorption can have the detrimental effect of lessening color perception and visual acuity. Such prior art dyes have not been known to be capable of providing multiple band re-emission or fluorescence of the absorbed radiation which is why they lessen color perception.

Certain optical systems utilizing fluorescent dyes are known. So-called "aura" glasses have utilized unstable spectral sensitizing fluorescent material, such as pinacyanol bromide, but have no practical visual utility as sunglasses as the fluorescent material is unstable and the thickness of the fluorescent layer is such that light falling on them is reflected as fluorescent radiation. In laser systems, certain fluorescent dyes in a liquid solution or carrier, have been utilized in optical elements to produce lasing effects. Such dye systems are required to be liquid in order to be pumped or replenished. Other laser systems utilizing fluorescent dyes in solid optical elements have been provided as a part of a waveguide structure to receive lateral, as opposed to transversing light.

Dyes which absorb visible radiation and fluoresce in the visible spectrum are generally chemically unstable and subject to photodegradation, for example, in sunlight. Therefore, such fluorescent dyes have not normally been thought of as being suitable for use as energy absorbing dyes in sunglasses. Additionally, the utility of many fluorescent dyes, whether stable or not, is diminished, in a practical sense, by their transmission characteristics in the visible region. Only a limited number of fluorescent dyes or combinations of fluorescent dyes, display the broad absorption and emission characteristics needed for a useful filtering lens in the visible radiation region.

It has now been determined, experimentally, that even when stable fluorescent dyes are used in sunglasses, that they surprisingly and unexpectedly are unsatisfactory for normal human wear and use because they reflect a distasteful fluorescent glow, often in a harsh red color.

Also in the prior art, U.S. Pat. No. 3,426,212 discloses systems for substantially modifying the wavelengths of radiation, consisting of at least two layers, each layer containing fluorescent substances which fluoresce at different wavelengths, so that light transmitted and fluoresced to a different wavelength by one layer impinges on the second layer which further fluoresces and further modifies the wavelength, the two wavelength modifications generally being in the same direction. The systems disclosed by this reference are not intended for human eye wear and indicate no knowledge of or concern for fluorescent glare or critical minimum thicknesses to avoid such glare.

U.S. Pat. No. 3,214,382 discloses an optical system including phosphorescent material, but does not teach the use of fluorescent material in such a system.

U.S. Pat. No. 2,113,973 discloses a fluorescent layer including unstable rhodamine B which is somewhat protected from decomposition by use of a light filter which absorbs much of the radiation which causes decomposition. The systems taught by this reference are intended only for fluorescent reflection and not for light transmission. The reference indicates no intended use for human eye wear and indicates no knowledge of or concern for fluorescent glare or critical minimum thickness to avoid such glare.

Of other interest, although non-anticipatory of the present invention, are U.S. Pat. Nos. 2,498,593; 2,386,855 and 2,851,423, Canadian Pat. No. 504,529; United Kingdom Pat. No. 569,920; Shah, J. et. al, "Excited-State Absorption Spectrum of Cresyl Violate Perchlorate," Appl. Phys. Lett., 24(11), pp. 562–564 (June, 1974) and Chem. Abstracts, 85:114369n, Drexhage, K. et. al, "New Highly Efficient Laser Dyes."

SUMMARY OF THE INVENTION

In accordance with the practice of the present invention novel transparent optical filtering elements are provided which include thin layers of stable fluorescent materials. In preferred embodiments the elements both absorb and emit visible radiation by transmission. Such optical elements are ideally suited for use as sunglasses, but can also be utilized in ski goggles, underwater lenses, greenhouse windows, welders' goggles, and in optical systems including cameras, projectors, enlargers, photocopying systems, microscopes, binoculars, and telescopes. Additionally, they can be utilized in any optical system in which optical filtering or absorption of a portion of the visible spectrum is required.

In the preferred practice of the present invention, extremely stable fluorescent dyes, including the oxazine, carbopyronin and carbazine families of dyes, are utilized to provide the desired absorption and emission of transmitted light.

In operation, when visible electromagnetic radiation traverses an optical element including a thin layer or coating of fluorescent material, the radiation is not primarily scattered, reflected as fluorescent light or glare, nor distorted by the fluorescent material. Rather if the thickness of the fluorescent layer is properly selected, say 1 mil (0.0254 mm) or less, the radiation enters at one side and is absorbed to a greater or lesser degree by the fluorescent material and then re-emitted at the opposite side at a different but longer visible wavelength. This absorption and emission reduces the energy of the transversing light. Thus, fluorescent materials reduce light intensity and emitted light which appears to be transmitted light shifted slightly, yet significantly, towards longer wavelengths. However, by controlling the thickness of the fluorescent layer, distasteful, harsh fluorescent glare and reflection is avoided.

As is well known, fluorescence results from electrons in the composition absorbing energy and shifting to a higher energy state, followed almost immediately, by release of energy by the shifted electron and the return of the electron to a lower energy level or to its ground state. Energy released by the electron as it returns to lower energy levels is at a different, but longer, visible radiation wavelength than the wavelength of the energy absorbed.

In the practice of the present invention it is especially desirable that the fluorescent materials utilized in the thin non-reflective layer be stable and have a high quantum efficiency so that a significant percentage of the excited electrons return to their ground state with emission of visible longer wavelength radiation. An optical system employing at least one layer or thin film including at least one fluorescent material will emit one or more fluorescent radiation band which appears to be transmitted light upon its exposure to and absorption of visible light.

Surprisingly, it has been determined that optical elements prepared in accordance with the teaching of the present invention serve not only as excellent absorbers of visible radiation, such as sunlight, but, unexpectedly, also serve to increase a user's color perception, spectral sensitivity and acuity over that experienced with prior art optical filtering elements. In those instances where it is desirable to shift the sensitivity maxima of the eye to longer wavelengths than normal, the optical elements of the present invention provide that facility. It has also been discovered that such shifts are useful for increasing visual acuity in fields of vision which normally reflect light in only a narrow region of the visible spectrum, such as a bright sky. At the same time such systems can avoid the appearance of harsh distasteful fluorescent glare by controlling the thickness of the fluorescent layer.

In the practice of the present invention, the optical elements may be composed of various optically suitable plastics, or they may be composed primarily of glass, or other vitreous material. Included among the useful optical plastics are thermoplastic synthetic resins, including methyl methacrylate and related acrylic resins, polystyrene, styrene-acrylonitrite, polycarbonates, vinyl resins such as polyvinyl butyral, ionomers and monochlorotrifluoroethylene resins; cellulose derivatives, including cellulose acetate, cellulose nitrate, ethyl cellulose and, the most commonly used sunglass plastic, cellulose acetate butyrate. In some instances, thermosetting resins, including, allyl cast plastics such as the common optical material allyl diglycol carbonate, certain epoxies and polyester resins may be used.

In the practice of the present invention, the fluorescent material is associated with the optical element by a variety of means. In some embodiments fluorescent material is coated as a thin layer, preferably 1 mil or less in thickness on the optical element either as a wash solution from a solvent or as a coating, including a suitable binder. In other instances, the fluorescent material is included in a discrete film. Such a film can be used by itself, in the practice of the present invention, or the film may be associated with another optical element, for example, by binding it to the element, resolving it to a plastic element, heat forming it in association with other portions of an optical element or laminating it in association with one or more portions of an optical element. In any case, the fluorescent material is present as a thin layer or coating, preferably 1 mil or less in thickness to eliminate or minimize distasteful light scattering observed in films and coatings exceeding 1 mil in thickness.

Where the fluorescent material is dichroic, it is possible for the material to provide the dual function of fluorescence and polarization. This is accomplished by, for example, forming a transparent, linear, polymeric plastic sheet in which the dichroic fluorescent material is dispersed, rendering the sheet elastic, extending and then setting the sheet.

Preferred embodiments of the present invention utilize fluorescent dyes which are stable and are not degraded quickly or easily, for example, by sunlight. These include many stable members of the oxazine, carbazine, and carbopyronin families and stable members of other dye families, for example, Fluoral 555, stable coumarins such as 1,2,4,5,3H,6H,10H-tetrahydro-8-trifluoromethyl (1) benzopyrano (9,9a,1-gh)quinolizin-10-one and 1,2,4,5,3H,6H,10H-tetrahydro-9-carbethoxy(1')benzo pyrano(9,9a1-gh)quinolizin-10-one, the first available from Exciton Chemical Company, the latter two available from Eastman Kodak Company as EK #14371 and EK #14373, respectively.

Stable and preferred fluorescent oxazines include cresyl violet perchlorate (5,9-diaminobenzo(a)phenoxazonium perchlorate), nile blue A perchlorate (5-amino-9-diethylaminobenz a phenoxazonium perchlorate); and oxazine 170 perchlorate (9-ethylamino-5 ethylamino-10-methyl-5H-benzo (a)phenoxazonium perchlorate), available from Eastman Kodak Company as EK #11884, EK #11953 and EK #14375

Stable fluorescent oxazine, carbazine and carbopyronin dyes which are useful in the practice of the present invention can be represented by the following generic structural formulas:

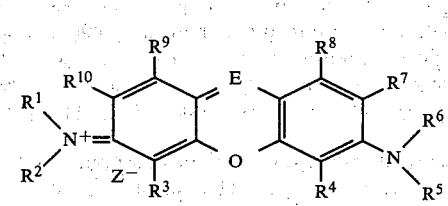

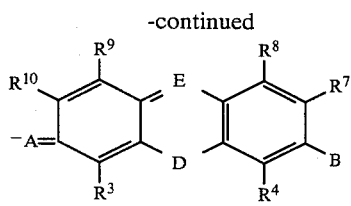

wherein:
- $R^1$, $R^2$, $R^5$, and $R^6$ each represent a member selected from the group consisting of a hydrogen atom; a lower alkyl radical; a lower alkoxy radical; a lower alkyl radical containing one solubilizing substituent from among the group $-SO_3H$, $-COOH$, $-OH$, and $-NH_2$; and $R^1$ and $R^{10}$, $R^2$ and $R^3$, $R^5$ and $R^4$, and $R^6$ and $R^7$ each represent a pair of atoms which, when taken together, represent the carbon atoms necessary to complete a fused 5-, 6-, or 7-membered heterocyclic ring;
- $R^3$, $R^4$, $R^7$, $R^8$, $R^9$, and $R^{10}$ each represent a member selected from the group consisting of a hydrogen atom; a lower alkyl radical; a lower alkoxy radical; an aryl group; a halogen atom; and $R^7$ and $R^8$, and $R^9$ and $R^{10}$ each represent a pair of atoms which, when taken together, represent the carbon atoms necessary to complete a fused 5- and 6-membered carbocyclic or heterocyclic ring;
- Z-represents an anion;
- A represents an atom selected from the group consisting of oxygen; sulfur; and selenium;
- B represents a member selected from the group consisting of a hydroxyl radical; a thiol radical; a selenol radical; and an amine radical;
- D represents a member selected from the group consisting of an oxygen atom; a sulfur atom; a selenium atom; and a carbon atom with two additional substituents each being a member selected from the group consisting of a hydrogen atom; a lower alkyl radical; an alkoxy radical; a thioalkyl radical; C-1 and C-5 of 3-oxo-1, 4-pentadiene; and C-2 and C-6 of 4-oxo-3, 5-dimethyl-2, 5-heptadiene;
- E represents a member selected from the group consisting of a nitrogen atom; a phosphorous atom; a carbon atom with one additional substituent selected from the group consisting of a hydrogen atom; a lower alkyl radical; a one to three ring aryl radical; a heterocyclic ring; C-2 of a benzoic acid radical; and C-2 on the aromatic ring of an ethyl benzoate radical.

Specific stable fluorescent visible absorbers embraced within the above formula include dyes consisting of the chemical compounds described by the following structural formulas which, for convenience, are used as representative of the various resonating structures of the dyes:

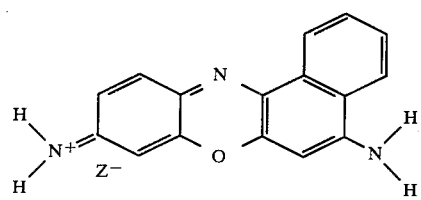

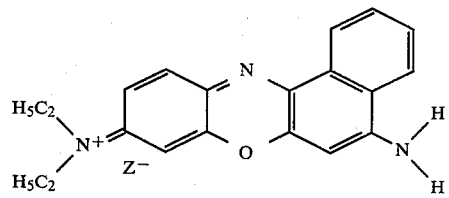

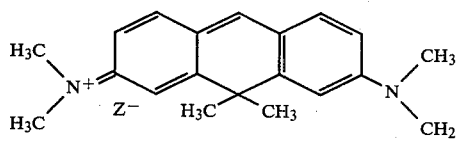

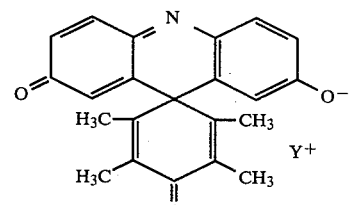

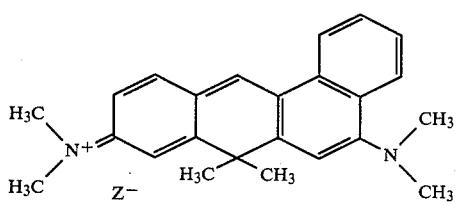

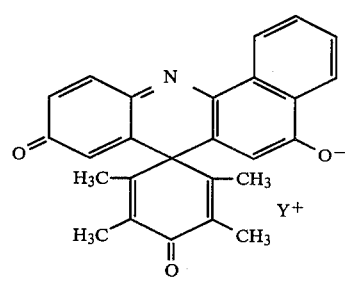

wherein:
- Z− represents an anion;
- Y+ represents a cation.

The stable compounds of Formulas I and II have been found to possess exceptionally desirable spectral absorption and fluorescent emission characteristics. They have also been found to have a primary absorption maximum in the upper middle or yellow region of the visual range and also a secondary absorption maximum in the short end of the visual range, primarily in the violet. Coupled with the above mentioned absorption maximum, there is re-emission of the absorbed energy at a primary fluorescence maximum in red region of the visible, along with a secondary fluorescence maximum in the blue region of the visible.

The choice of stable fluorescent materials, blends of stable fluorescent materials, or the combination in a system of fluorescent materials with other dyes or tints may vary in the practice of the present invention. Generally speaking, the present invention contemplates the inclusion of a thin layer including any one or more stable fluorescent materials in an optical filtering element. In some embodiments of the invention, such as in sunglasses, both the color of the fluorescent material and the color change which the fluorescent material imparts to the light transmitted through the element becomes an important consideration. In such situations in which the color characteristics of a broad portion of the spectrum are important, it is especially beneficial to utilize one or more dyes or tints in combination with the fluorescent material. Where it is desirable to provide color transmission and enhancement over the broad range of visible light, this may be accomplished, for example, as shown in some of the following specific examples, by combining in the optical element stable fluorescent cresyl violet perchlorate, stable fluorescent nile blue A perchlorate and stable Fluoral 555, a fluorescent yellow tinting dye. A combination of stable fluorescent materials and tints, such as this, or similar combinations, provide broad band absorption and fluorescent emission characteristics, with each of the fluorescent materials having specific absorption and fluorescence maximas, and with the stable fluorescent yellow tinting dye utilized to emit light in the areas of the spectrum absorbed, for example, by the stable fluorescent cresyl violet perchlorate and/or nile blue A perchlorate.

Stable cresyl violet perchlorate, nile blue A perchlorate, and oxazine 170 perchlorate are especially useful in the production of optical filtering elements to be used in sunglasses. This is due to the fact that each gives color enhancement to two or more different visible wavelengths.

Nevertheless, each of these fluorescent materials, when used alone in an optical element, cause an alteration in the spectral distribution of light. However, it has been found, that by adding a stable fluorescent yellow or green tint to optical filtering elements, including one or more of these stable fluorescent materials, the spectral distribution is restored to a high degree of normality. Therefore, although dye blending and tinting is not required by the present invention, it is of value in preferred applications, such as sunglasses for human use. At the same time, such sunglasses avoid harsh and distasteful fluorescent glare by controlling the thickness of the fluorescent layer.

In the use of the dyes and binders, virtually any non-interfering solvent suitable for the dye and binder may be utilized. In practice, the most practical method of dissolving the stable dyes may be to dissolve them in solvents such as dimethylformamide, followed by dilution with the solvent of choice for the binder system. Other solvents having utility for the stable dyes include, but are not limited to, isobutyl alcohol, acetone, diacetone alcohol, N-methyl-2-pyrrolidone, cellosolve, pyridine, piperidine, dicyclohexylcarbodiimide, dimethyl sulfoxide, ethanol, ethylene glycol, isopropanol, methanol, methyl ethyl ketone, toluene, xylene and 1-formyl piperidine.

Where desired compatable commercial surfactants, such as Igepal and Triton may be included in the dye solutions.

The amount of fluorescent material utilized in the practice of the present invention may vary over a broad effective range, and will vary depending upon the manner in which the fluorescent material is associated with the optical element and the light transmission and absorption characteristics of other portions of the optical element. The most effective manner in which to characterize the amount of fluorescent material utilized in an optical filtering element is in terms of its average light transmission or absorption. The utility of this manner of characterization is due to the fact that expression of the amount of fluorescent or other materials in terms of concentration may tend to be imprecise. This is due to the fact that light absorption and transmission is affected, not only by the type of dye and its concentration, but also by the thickness of the fluorescent material coating through which the light is transmitted. It is therefore the desire of the present invention to provide optical filtering elements which, in combination with all of the portions of the element, reduce average visible light transmission by an amount in the range of about 10% to about 99%. In most preferred embodiments, such as in sunglasses, a 50% to 90% reduction in average light intensity is preferred.

Stated in terms of conventional concentrations, for coating thicknesses in the range of about 0.0254 mm to about 0.00001 mm, and in the absence of other light absorbing portions in the optical element, the fluorescent material may constitute as little as about 10 parts per million to as much as about 10,000 parts per million of a coating composition. However, it must be remembered that the exact amount of dye utilized in coatings will vary in accordance with the specific dye utilized, the thickness of the fluorescent material coating, and the light transmission characteristics of the other portions of the optical element.

In the formation of the various preferred filtering elements, it will be appreciated that the thickness of the various coatings of the stable fluorescent dye containing layers is critical if harsh and distasteful reflected glare is to be avoided. The thickness is preferably as thin as possible, and normally less than 1 mil. Concentrations of dyes are normally as dilute as possible for reasons of economy, and weight, and to minimize light scattering caused by the various layers and dyes.

Many variations in the optical filtering element structure are contemplated and included within the scope of the present invention. The present invention is intended to include any structure in which a stable fluorescent material containing layer, having a thickness which avoids distasteful reflected glare, is incorporated or included within an optical filtering element. Such structures include the combination of the fluorescent material within the optical element, and the wash coating, binder coating, or laminating of the material to one or both surfaces of a two-sided optical element. Other useful structures include coating both surfaces of an optical element with either the same or different dyes, including the variation in which either one or both of the dyes is fluorescent. In other modifications a fluorescent material containing layer may be utilized by itself or laminated between two other optical elements. The present invention also contemplates utilizing other art known optical structures and techniques. Furthermore, the utilization of the fluorescent material containing optical elements of the present invention with other dyes, optical opacifiers and/or optical polarizing elements, either as a portion of an element separate from the fluorescent material, or in combination with the fluorescent material, is contemplated by the present invention. However, it has been noted that when non-stable or impure materials are in contact with stable dyes the stable dyes may tend to deteriorate.

In any event, the various embodiments of the present invention provide absorption of visible radiation for the purpose of decreasing overall light intensity. Depending upon the fluorescent material utilized, and the other nonfluorescent dyes, opacifiers or polarizers included in the element, the sensation of certain colors is enhanced, for example, in comparison to the sensation obtained using prior art sunglasses, at the same time that the average light intensity is decreased and harsh and distasteful reflected glare is avoided by controlling the thickness of the fluorescent layer.

In virtually every form used, the present invention provides increased color contrast in the field of vision and increased visual acuity in environments which normally have low contrast, such as snowfields or bright skies. This latter property makes the use of the present invention especially attractive for incorporation into sunglasses, ski goggles and glasses utilized by airplane pilots. It is contemplated that it may be desirable to produce portions of or whole windshields of a vehicle in accordance with the present invention. The present invention is also useful in some forms of microscope wherein the amount of available light is limited. The same quality may be utilized in optical elements utilized in binoculars and telescopes. When incorporated into the optical elements of photographic equipment, by selection of the fluorescent dye utilized, the equipment may be tuned to bring out, alter or compliment specific colors or combinations of colors. The optical elements of the present invention may also be utilized in projectors, photocopying devices and greenhouse windows. However, despite all of these collateral uses, it is contemplated that the broadest and most practical field of use of the present invention will be in sunglasses for use under conditions of natural daylight to decrease visible light intensity while at the same time avoid distasteful glaring appearance and preserving or increasing the color sensation of the user, as compared with the sensation experienced with prior art sunglasses.

BRIEF DESCRIPTION OF THE DRAWINGS

The various objects and features of the present invention will be more fully understood from the following detailed description of preferred embodiments and applications thereof, throughout which description reference is made to the accompanying drawings, in which.

DESCRIPTION OF THE PREFERRED EMBODIMENTS

The following examples show by way of illustration, and not by way of limitation, the preparation of optical elements in accordance with the present invention.

EXAMPLE I

Figure 1:
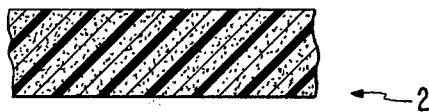
FIG. 1 is an exaggerated diagrammatic cross-sectional view of one form of an optical filtering element produced in accordance with the teaching of the present invention.

Referring to FIG. 1, one form of optical filtering element 2 was prepared as follows. Pure fluorescent, stable laser grade cresyl violet perchlorate (5,9-diaminobenzo(a)phenoxazonium perchlorate), obtained from Eastman Kodak Company as Laser Dye Catalog No. 11884, was formulated directly into a plastic carrier by dissolving 0.30 g of the fluorescent dye in 5 ml dimethylformamide, diluting this solution with 5 g dimethoxyethel phthalate. The resultant solution was then added dropwise to a melted 100 g sample of cellulose acetate butyrate (CAB) on a two roll mill. After approximately three minutes of milling, the dye was completely and evenly dispersed throughout the CAB. Subsequently, the mixture was withdrawn from the mill and allowed to cool.

A thin sheet was formed by hot pressing a portion of the CAB-cresyl violet perchlorate mixture between two ferrotype plates to a thickness of about 0.01 inches (0.254 mm). At this thickness, when viewed in sunlight from more than about 10 inches (25 cm) away, the film gave off a harsh fluorescent, almost blood red glow. When formed into a lens, placed in an eyeglass frame and worn, the wearer appeared grotesque and unnatural due to the glow and the color of the lenses. However, when the sheet was calendered to produce film element 2, just less than about 1 mil (0.0254 mm) no such fluorescent glow or color was observed from the film and the resulting sheet 2 was of excellent optical filtering quality. Examination indicated that the cresyl violet perchlorate remained completely dispersed in element 2 without apparent crystallization, color degradation, or noticeable bleeding to the surface. Optical filtering element 2 was purple in color, and upon examination was found to reduce the average transmitted visible light by about 67%. When used in a "sunglass" 4 as optical lens 6, this composition was found to increase the color sensation of the sunglass user, especially for reds, oranges, golds and browns. An especially dramatic effect was apparent to users on viewing natural woods and normally dull red objects such as stop signs and lights. A natural outdoor scene viewed through lens 6 was perceived by users as overall cool blue-white, with visual acuity and contrast increased in areas where shades of brown, brown-red, and gold-brown intermingled. The use of lens 6 to view blue objects such as the sky resulted in the sensation to the user of a more color-rich environment then when the same scene was observed with the naked eye. This effect was particularly dramatic in increasing acuity when bright skies and scattered light clouds normally make it difficult to discern the sky from the clouds since lens 6 caused the blue areas of the sky to appear much deeper in color, thus increasing its contrast with the white clouds.

Film 2, by itself, was quite fragile as lens 6 in sunglass 4. For practical day use it is laminated to a rigid clear or tinted lens to provide a structure which is resistant to mechanical damage.

Figure 2:
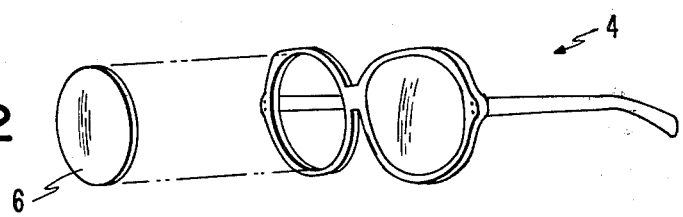
FIG. 2 is a partially exploded perspective view showing one means by which an optical filtering element of the present invention in the form of a lens may be associated with an eyeglass frame.

It will be apparent that not only film 2, but any of the other following described structures can be used as lens 6 in FIG. 2.

EXAMPLE II

Figure 3:
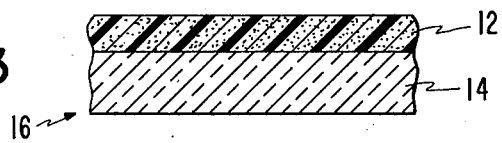
FIGS. 3 through 12 are exaggerated diagrammatic cross-sectional views of other forms and modifications of the optical filtering element of the present invention, all of which may be utilized in the structure of FIG. 2.

Another form of optical filtering element was produced as follows. To a solution containing 50 ml cellosolve acetate, 50 ml acetone, and 2.5 g dissolved cellulose acetate butyrate was added 5 ml of a solution of 0.7 g laser grade cresyl violet perchlorate in 95 g dimethylformamide. Referring to the cross-section shown in FIG. 3, which is not to scale, the resulting lacquer was applied by air brush as coating 12 having a dry thickness of about 0.001 mm to a clean glass optical element 14. In its preparation, coating 12 was allowed to air dry for 5 minutes, and then was dried further by heat in an oven for 15 minutes at about 82° C. Resulting optical element 16 had transmissive and visual properties similar to the element 2 of Example I. However, the method of this example allows for variation in the optical density of the element 16 by controlling the thickness and concentration of coating 12 applied to glass substrate 14. Thicknesses ranging to as little as about 0.0001 mm, and less, can be obtained by this technique. However, in all instances, thickness of the fluorescent layer 12 is kept below the level at which fluorescent glow and harsh glare is observed.

EXAMPLE III

Figure 4:
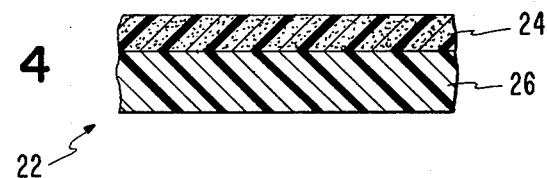

Several different forms of optical filtering element 15 were prepared from the following coating solution of fluorescent material, prepared by combining 32 g diacetone alcohol, 45 g methanol, 17 g isopropanol, 6 g cellulose acetate butyrate, 0.086 g cresyl violet perchlorate, and 0.017 g Eastman Kodak Company Laser Products Catalogue #11953 pure, fluorescent, stable, laser grade nile blue A perchlorate (5-amino-9-diethylaminobenz-(a)phenoxazonium perchlorate). Referring to FIG. 4, which is not to scale, optical element 22, shown in cross-section, was prepared by casting the above solution as layer 24 onto 0.06 inch (1.5 mm) thick polymethyl methacrylate sheet 26 using a standard 0.008 inch (0.2 mm) slotted draw bar. The resulting plastic sheet was air dried 5 minutes and then oven dried for an additional 30 minutes at about 93° C. to a sheet having the thickness of about 0.02 mm. Optical element 22 of FIG. 4 stamped from this sheet had properties similar to that of Example I, but it was noted that the combination of cresyl violet perchlorate and nile blue A perchlorate in fluorescent layer 24 provided the appearance of more balanced color to the user than did the use of cresyl violet perchlorate alone in the fluorescent layer. Optical filtering element 22 was found to contrast the difference between bright blue sky and white or grey clouds even more than the composition of Examples I or II.

The compositions of Examples I, II, and III were found to have excellent light stability when tested by accelerated light exposure in laboratory temperature and humidity chambers. It was found, for example, that less than 10% of the dye was degenerated after approximately one year's equivalent sunlight exposure.

It was found that the composition of Example III could be easily modified to produce other color effects, and to produce optical filtering elements similar in appearance and color to common grey and green commercial sunglasses.

Figure 5:
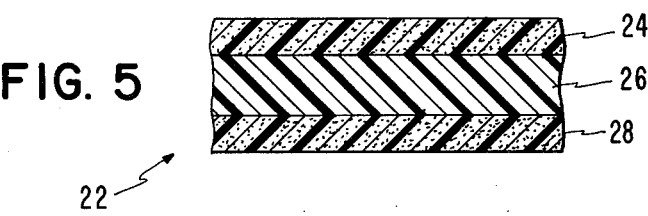

Referring to FIG. 5, which is not to scale, one such modification was made by coating the element 22 of the side opposed to fluorescent composition 24 with a second tinting lacquer 28 prepared by mixing 32.5 g methyl ethyl ketone, 40 g cellosolve, 10 g cellulose acetate butyrate, 25 g Rohm & Haas Acryloid B-66 (40% solids in toluene), and 1.25 g Sandoz Acetosol Yellow RLSN. This yellow dye is stable, but is not fluorescent.

Figure 6:
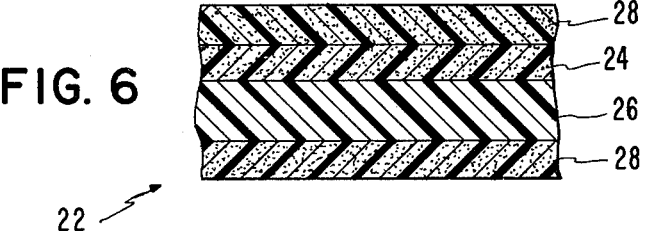

The overall color appearance of element 22 of FIG. 5 is varied from blue-grey to green-grey to green by the expedient of varying the concentration of the yellow dye in coating 28, or, as shown in FIG. 6, not to scale, coating both sides of the element with yellow tinting lacquer 28. While not shown, in preferred embodiments, a thin barrier layer of, for example, clear CAB or adhesive is applied between top adjacent layers 24 and 28 to avoid contamination of the pure, stable fluorescent dye in layer 24. Contamination results in the destabilization of the stable fluorescent dyes, lead to their degeneration, and thus to the loss of the improved visual qualities of this invention.

Optical elements 22 shown in FIGS. 5 and 6 which were produced from these variations of FIG. 4 had colors similar to commercial sunglass lenses. However, scenes viewed through them provided a perception of enhanced color due apparently to the effects of the fluorescent materials incorporated in layer 24. In scenes of low light level (sunrise, sunset, cloudy skies) whereas normal commercial and polarized sunglasses reduced color perception and therefore visual acuity, optical elements 22 provided overall reduction in light intensity without loss of color perception and with increased contrast. Scenes with blues, blue-greens, browns, reds and oranges were found to be especially attractive, bright and warm.

EXAMPLE IV

In a modification of Example III, the acetosol Yellow RLSN tinting dye was added directly to the cresyl violet perchlorate, nile blue A perchlorate lacquer mixture. The lacquer resulting from this combination was initially found to produce results essentially identical to those produced in Example III, FIGS. 5 and 6, in which the fluorescent and yellow tinting coatings were coated separately. However, it was determined that the otherwise fluorescent dye material in the element had increased sensitivity to light and tended to degrade. Nevertheless, the composition of this example has utility for occasional use or for use in areas of limited light, such as microscope lenses.

EXAMPLE V

Figure 7:
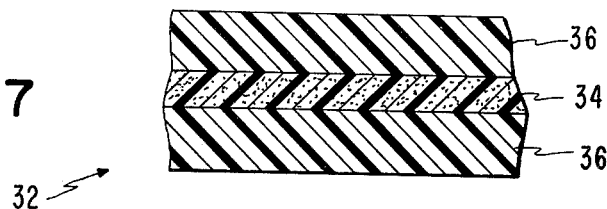

This example illustrates another form of optical element and the variety and interchangeability of materials which can be used to produce an optical filtering element. Referring to FIG. 7, not to scale, optical element 32 includes fluorescent material 34 in an interior position of element 32. A coating solution was prepared by mixing 57 g ¼ sec RS Nitrocellulose, 30 g ethyl acetate, 13 g butyl acetate, and 0.10 g pure, stable, fluorescent, laser grade cresyl violet perchlorate. This solution was then cast onto a sheet of allyl digylycol carbonate using a slotted draw bar. After drying to a thickness of about 0.008 mm, the resulting fluorescent material containing film was laminated to and between a second allyl digylycol carbonate sheet using polyvinyl acetate-alcohol solvent based optical adhesive to produce element 32 in which fluorescent material containing coating 34 is incorporated between the two outer layers 36 of allyl digylycol carbonate. Thus, in this form outer layers 36 protect fluorescent material layer 34 from mechanical damage due to abrasion, wear and exposure to the elements.

EXAMPLE VI

Figure 8:
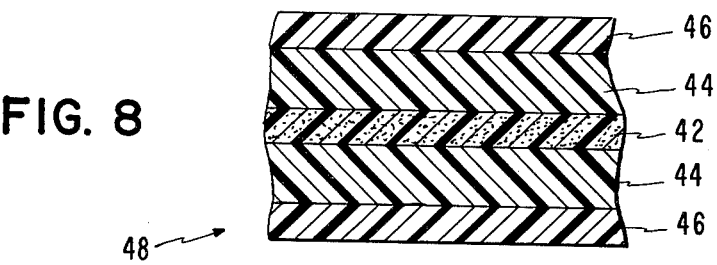

A solution of fluorescent material and polyvinyl butyral binder was prepared by dissolving 0.010 g cresyl violet perchlorate, 0.0017 g Eastman Kodak Company fluorescent, stable, laser grade EK #14375 oxazine 170 perchlorate (9-ethylamino-5 ethylimino-10-methyl-5H-benzo(a)phenoxazonium perchlorate), and 10 g Butvar B-74 polyvinyl butyral in 100 g of a solvent mixture consisting of 5% water, 8% diacetone alcohol, 10% butyl lactate, 12% ethanol and 65% glacial acetic acid. Referring to FIG. 8, the resulting viscous casting lacquer was drawn down in several different solvent containing coatings to thicknesses in the range of about 0.002 to about 0.008 inch (about 0.05 to about 0.2 mm) on the untreated side of a commercial optical 0.015 inch (0.375 mm) thick cellulose acetate butyrate (CAB) sheet 44 coated on one side with melamine abrasive resistant coating 46. After partially drying for approximately 15 minutes at 50° C. a second sheet of the CAB 44 abrasive resistant coated was pressure laminated to the fluorescent lacquer coating, abrasive resistant coating 46 out, the cast film having sufficient tack to bond the films together. The resulting filtering element 48, including dry fluorescent material containing layer 42 having dry thickness in the range of about 0.005 to about 0.02 mm, had excellent optical qualities.

In a modification of this technique, the fluorescent material containing solution was cast onto a release coated glass surface and dried to a tough, coherent film about 0.01 mm thick by heating at about 70° C. for one hour. This film was then removed from the glass and then laminated between two cellulose acetate butyrate abrasive resistant coated sheets, as above. The lamination was carried out in two operations using a polyvinyl alcohol-acetate optical adhesive. The resulting optical element was found to provide enhanced color and visual acuity to the user.

The untinted versions of this optical element had properties similar to those of Example III, the finished element having the layer containing the fluorescent materials protected from mechanical deterioration by the hard-surfaced abrasive resistant coating.

EXAMPLE VII

A coating solution was prepared by dissolving 2.5 g cellulose acetate butyrate and 2.5 g Acryloid B-66 methyl methacrylate acrylic resin in a solvent mixture consisting of 60 g methyl ethyl ketone, 25 g toluene and 10 g cellosolve. A fluorescent coating solution was prepared by dissolving 0.05 g pure, stable, fluorescent, laser grade cresyl violet perchlorate, 0.01 g of fluorescent, laser grade nile blue A perchlorate, 0.025 g of ethyl antioxidant 360 and 0.025 g of Ciba-Geigy Tinuvin 326 ultraviolet absorber in 50 g of the butyrate-acrylic lacquer. A separate tint coating solution was then prepared by dissolving 0.5 g stable, non-fluorescent Eastman Fast Yellow GLF in 9.5 g of a 1:1 mixture of methyl ethyl ketone and cellosolve, and adding this solution to 40 g of the clear butyrate-acrylic lacquer.

Figure 9:
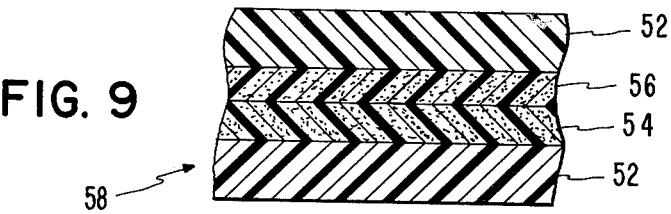

The optical filtering element of FIG. 9, not to scale, was then prepared using two sheets 52 of transparent styrene-acrylonitrile. One sheet was coated with fluorescent layer 54 and one sheet 52 was coated with non-fluorescent yellow tinting solution 56, both coatings being made using a draw down technique. These coatings were then oven dried for 15 minutes at 82° C., with both coatings having a dry thickness of about 0.02 mm. The two coated sheets were then laminated, coated side to coated side, using an optical grade polyvinyl-acetate-alcohol adhesive, not shown, which joined, but separated fluorescent layer 54 and yellow-tinted layer 56 to produce optical filtering element 58.

EXAMPLE VIII

Figure 10:
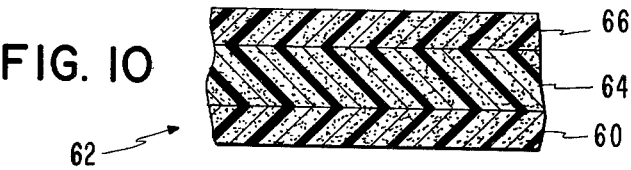

Referring to FIG. 10, an optically excellent lens 59 was prepared by modifying an existing yellow tinted methyl methacrylate commercial lens 60, in accordance with the teaching of the present invention. Yellow tinted methyl methacrylate lens 60 was removed from a commercial sunglass, and immersed for 30 seconds (so that both sides of lens 60 would be coated), in a solution heated to about 51° C. containing 0.170 g laser grade cresyl violet perchlorate, 0.05 g laser grade nile blue A perchlorate, and 0.51 g yellow, stable, fluorescent, laser grade Exciton Chemical Company Fluoral 555, 30 cc spectro grade dimethyl formamide, 70 cc spectro grade isobutyl alcohol, and 0.5 g Igepal CO 430 surfactant. This lens was oven dried 30 minutes at about 82° C. The resulting optical element 62, coated on both sides with fluorescent coating 61, less than 0.0254 mm in thickness, exhibited a grey-green color. Element 62 was transparent, non-reflective and of high quality.

Using the procedure of Example VIII, optical elements having tints ranging from the original yellow color of lens 60 to deep green colors can be obtained by varying the concentration of fluorescent materials in the dip coat, typically between a total of about 100 and 900 ppm, of the fluorescent materials by weight of the coating solution.

EXAMPLE IX

Figure 11:
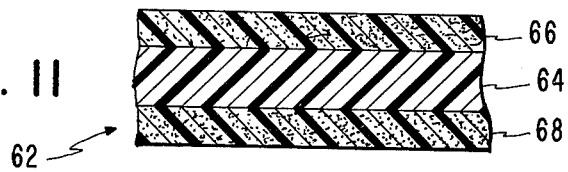

This example provides an excellent sunglass element 62 of FIG. 11, not to scale. It can provide the same color as the grey and grey-green lenses in vogue, yet provides the user with markedly increased color perception and visual acuity as compared to commercial sunglasses. A coating solution was prepared by dissolving 1.42 g cellulose acetate butyrate, 0.0524 g laser grade cresyl violet perchlorate, and 0.0104 g laser grade nile blue A perchlorate in a solvent mixture consisting of 31.6 g methanol, 31.6 g methyl ethyl ketone, 25 g cellosolve acetate, and 10.4 g cellosolve. A sheet 64 of 0.04 inches (1.0 mm) thick cellulose acetate butyrate was coated on one side with this solution, allowed to air dry 5 minutes, and then oven dried for about 15 minutes at about 93° C. to form layer 66 which was about 0.005 mm in thickness. The other side of the sheet was then wash coated with stable, non-fluorescent Schwartz Chemical Company LB Yellow Rez-N-Dye to form coating 68. Depending on the concentrations of the yellow dye, resulting optical element 62 ranged from a blue-grey to a smoke color. Lenses which appeared grey-green to green were also produced using this technique. All lenses displayed superior color enhancement as compared to commercial sunglasses.

EXAMPLE X

Figure 12:
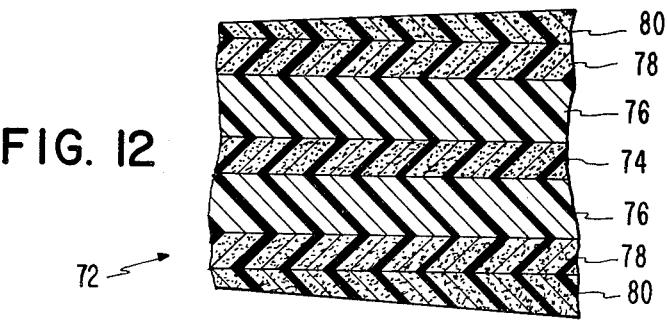

Referring to FIG. 12, not to scale, the optical element 72 of this example was prepared by first laminating a light polarizing sheet of stretch oriented, iodine containing polyvinyl butyral 74 between two 0.015 inch (0.375 mm) layers of cellulose acetate butyrate 76. This laminate was then immersed in a solution containing 0.8 g cellulose acetate butyrate, 4.2 g cellosolve acetate, 4.2 g methyl ethyl ketone, 4.5 g diacetone alcohol, 12.9 g methanol and 0.009 g pure, stable, Eastman Kodak Laser Catalogue #14375 oxazine 170 perchlorate to provide fluorescent material containing coating 78 about 0.002 mm thick. After oven drying coatings 78 for 15 minutes at 82° C. the element was wash coated and tinted by immersion in a solution containing 31 ml water, 69 ml methanol, 10 ml isopropyl alcohol, and 100 ml Schwartz Chemical Company Emerald Green Rez-N-Dye, the element being withdrawn slowly and evenly from the solution over a 30 second time period. The effect of the timed withdrawal of the element from the wash coating was to create variable thickness coatings 80 of variable tint and color absorption similar to some such elements in common commercial sunglass use.

EXAMPLE XI

The following composition is highly preferred and is especially suited for use in the production of the lens of FIG. 8. However, by varying the solvent system, concentrations, and other components of the composition, it can be used to form any of the optical systems taught herein. A solution of 20 cc. of spectro grade dimethylformamide and 0.16 g of fluorescent laser grade cresyl violet 670 perchlorate, 0.05 g fluorescent laser grade nile blue 690 perchlorate and 0.55 g fluorescent laser grade Fluoral 555, all of which are available from Exciton Chemical Company. To this solution was added 10 cc. of N-methyl-2-pyrrolidinone and 70 cc of spectro grade m-xylene. For use as a dip coating, the solution was heated to about 50° C. and, for example, a clear methyl methacrylate lens is inserted into and then immediately removed from the solution. However, if desired the lens can be withdrawn at a uniform rate, in the range of say about 2 to 20 cm per minute to achieve a gradient color effect on the lens. After withdrawal from the solution the lens is dried in an oven for about 30 minutes at about 82° C. to produce a final coating less than about 0.025 mm thick. The lenses produced from this composition were of a high quality, non-reflective, transparent nature. Color perception through the lenses was not lost, and in fact appeared to be enhanced.

EXAMPLE XII

As in Example XI, this composition is highly preferred and can be used for dip coating to produce the lens of FIG. 8 or in other optical systems. The composition includes 0.165 g laser grade fluorescent cresyl violet perchlorate, 0.05 g laser grade fluorescent nile blue A perchlorate, 0.525 g laser grade fluorescent Fluoral 555, 20 cc spectro grade dimethylformamide, 10 cc deuterium oxide ($D_2O$) and 60 cc of N-methyl-2-pyrrolidinone. When used for dip coating it is first heated to about 50° C. and the coated lens subsequently dried as in Example XI.

It will be understood that the disclosed and other fluorescent materials may be used in any of the optical element configurations disclosed herein. It is to be further understood that any of the fluorescent materials disclosed, or other fluorescent dyes or combinations of fluorescent dyes and other dyes, opacifiers and/or polarizing elements can be used in a single optical filter element.

In all of the foregoing examples, the fluorescent material appeared to have a critical thickness, beyond which the optical element gave off a distasteful fluorescent glow or reflection. This unexpected problem has been overcome in the present invention by controlling the thickness of the fluorescent layer. Generally, a thickness of about 1 mil (0.0254 mm) or less will avoid this problem. It should be noted that the thickness of the fluorescent layer may be more than a function of the thickness of the coating. Where the substrate is thermoplastic material and the dye system includes solvents, the solvent, and thus the dye may be imbibed into the thermoplastic material for some depth. Therefore, the solvents and plastics should be selected so that the total of imbibition and coating thickness does not exceed about 1 mil.

Although the invention has been particularly described and shown with reference to preferred embodiments therein, it will be understood by those skilled in the art that the foregoing and other changes in form and detail may be made therein without departing from the spirit and scope of the invention.

What is claimed is:

1. A substantially solid, dry, substantially transparent optical filter element which absorbs, on the average, from about 10% to about 99%, and transmits, on the average, from about 90% to about 1% visible radiation having wavelengths in the range of about 400 nm to about 700 nm including:

optical means, said optical means including at least one substantially discrete fluorescent means having two opposed surfaces, said fluorescent means including fluorescent material which is substantially stable and which has the ability to absorb transversing visible radiation of one or more wavelengths which is incident on one surface of said fluorescent means and to then emit visible radiation from its opposed surface, substantial amounts of said emitted radiation being at different wavelengths than the radiation absorbed, said fluorescent means being of a thickness of no greater than about 1 mil (0.0254 mm) between its opposed surfaces so that the incident side of said fluorescent means does not scatter, reflect or emit substantial amounts of radiation.

2. The optical filter element of claim 1 wherein the stable fluorescent material is selected from the group of dyes consisting of light stable oxazine, light stable carbazine and light stable carbopyronin represented by the following generic structural formulas:

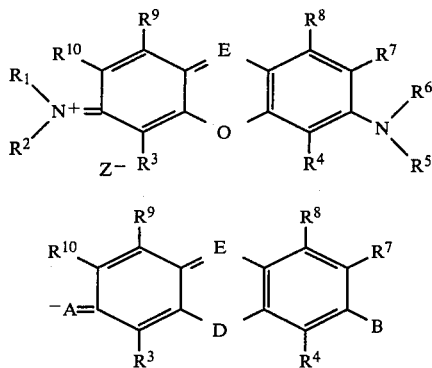

wherein:

$R^1$, $R^2$, $R^5$, and $R^6$ each represent a member selected from the group consisting of a hydrogen atom; a lower alkyl radical; a lower alkoxy radical; a lower alkyl radical containing one solubilizing substituent from among the group —$SO_3H$, —COOH, —OH, and —$NH_2$; and $R^1$ and $R^{10}$, $R^2$ and $R^3$, $R^5$ and $R^4$, and $R^6$ and $R^7$ each represent a pair of atoms which, when taken together, represent the carbon atoms necessary to complete a fused 5-, 6-, or 7-membered heterocyclic ring;

$R^3$, $R^4$, $R^7$, $R^8$, $R^9$, and $R^{10}$ each represent a member selected from the group consisting of a hydrogen atom; a lower alkyl radical; a lower alkoxy radical; an aryl group; a halogen atom; and $R^7$ and $R^8$, and $R^9$ and $R^{10}$ each represent a pair of atoms which, when taken together, represent the carbon atoms necessary to complete a fused 5- and 6-membered carbocyclic or heterocyclic ring;

Z—represents an anion;

A represents an atom selected from the group consisting of oxygen; sulfur; and selenium;

B represents a member selected from the group consisting of a hydroxyl radical; a thiol radical; a selenol radical; and an amine radical;

D represents a member selected from the group consisting of an oxygen atom; a sulfur atom; a selenium atom; and a carbon atom with two additional substituents each being a member selected from the group consisting of a hydrogen atom; a lower alkyl radical; an alkoxy radical; a thioalkyl radical; C-1 and C-5 of 3-oxo-1, 4-pentadiene; and C-2 and C-6 of 4-oxo-3, 5-dimethyl-2, 5-heptadiene; E represents a member selected from the group consisting of a nitrogen atom; a phosphorous atom; a carbon atom with one additional substituent selected from the group consisting of a hydrogen atom; a lower alkyl radical; a one to three ring aryl radical; a heterocyclic ring; C-2 of a benzoic acid radical; and C-2 on the aromatic ring of an ethyl benzoate radical.

3. The optical filter element of claim 2 wherein the stable fluorescent material is cresyl violet perchlorate having a structure and formula of:

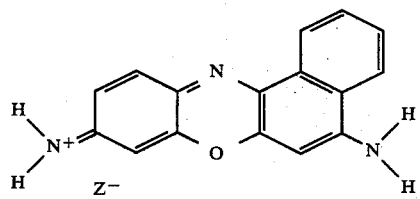

wherein $Z^-$ is $ClO_4^-$.

4. The optical filter element of claim 2 wherein the stable fluorescent material is nile blue A perchlorate having a structure and formula of:

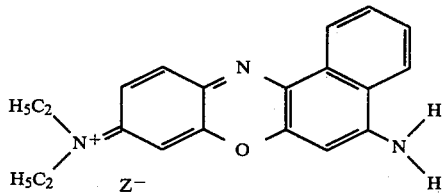

wherein Z is $ClO_4^-$.

5. The optical filter element of claim 2 wherein the stable fluorescent material is oxazine 170 perchlorate having a standard chemical name of:
9-ethylamino-5-ethylimino-10-methyl-5H-benzo(a)-phenoxazonium perchlorate.

6. The optical filter element of claim 2 wherein the stable fluorescent material includes a combination of cresyl violet perchlorate and nile blue A perchlorate.

7. The optical filter element of claim 1 wherein the stable fluorescent material is carbopyronin 149 having a structure and formula of:

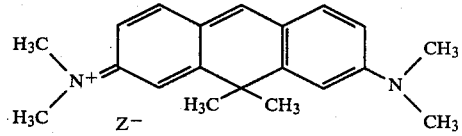

wherein $Z^-$ is an anion.

8. The optical filter element of claim 1 wherein the stable fluorescent material is carbazine 122 having a structure and formula of:

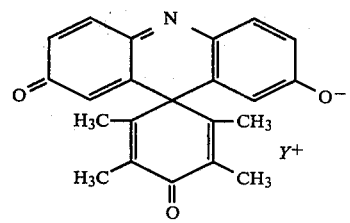

wherein $Y^+$ is a cation.

9. The optical filter element of claim 1 wherein said fluorescent means is the body of said optical element.

10. The optical filter element of claim 1 wherein said optical means further includes a transparent substrate having two opposed surfaces, said transparent substrate and fluorescent means being substantially parallel and in light transmitting optical relationship to one another.

11. The optical filter element of claim 10 wherein said fluorescent means is present as a coating on at least one surface of said transparent substrate.

12. The optical filter element of claim 10 wherein said fluorescent means is present as a film associated with at least one surface of said transparent substrate.

13. The optical filter element of claim 10 wherein said fluorescent means is present as a substantially discrete layer imbibed in one surface of said transparent substrate of said optical element.

14. Human eyewear wherein the optical portion of said eyewear includes the optical means of claim 1.

* * * * *